(12) United States Patent
Okada et al.

(10) Patent No.: US 9,290,068 B2
(45) Date of Patent: *Mar. 22, 2016

(54) WHEEL POSITION DETECTOR AND TIRE INFLATION PRESSURE DETECTOR HAVING THE SAME

(71) Applicant: DENSO CORPORATION, Kariya, Aichi-pref. (JP)

(72) Inventors: Noriaki Okada, Chiryu (JP); Masashi Mori, Obu (JP); Takatoshi Sekizawa, Kariya (JP); Nobuya Watabe, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/365,576

(22) PCT Filed: Dec. 4, 2012

(86) PCT No.: PCT/JP2012/081871
§ 371 (c)(1),
(2) Date: Jun. 13, 2014

(87) PCT Pub. No.: WO2013/089045
PCT Pub. Date: Jun. 20, 2013

(65) Prior Publication Data
US 2014/0340213 A1    Nov. 20, 2014

(30) Foreign Application Priority Data

Dec. 16, 2011  (JP) .................................. 2011-276013

(51) Int. Cl.
*G06F 17/00*    (2006.01)
*B60C 23/04*    (2006.01)

(52) U.S. Cl.
CPC .......... *B60C 23/0416* (2013.01); *B60C 23/0405* (2013.01); *B60C 23/0488* (2013.01); *B60C 23/0489* (2013.01)

(58) Field of Classification Search
CPC ............ B06C 23/0408; B06C 23/0415; B06C 23/0416; B06C 23/0488; B06C 23/0489
USPC ................................................... 235/375, 492
See application file for complete search history.

(56) References Cited

U.S. PATENT DOCUMENTS 5,602,524 A * 2/1997 Mock et al. .................... 340/447
6,018,993 A * 2/2000 Normann et al. ............ 73/146.5

(Continued)

FOREIGN PATENT DOCUMENTS

EP      2450202 A1     5/2012
JP    H10-048233 A     2/1998

(Continued)

OTHER PUBLICATIONS

International Search Report and Written Opinion of the ISA for PCT/JP2012/081871, ISA/JP, mailed Mar. 1, 2013.

*Primary Examiner* — Paultep Savusdiphol

(74) *Attorney, Agent, or Firm* — Harness, Dickey & Pierce, P.L.C.

(57) ABSTRACT

A wheel position detector for a vehicle includes: a transmitter at each wheel having a first controller for generating and repeatedly transmitting a frame with specific identification information and an acceleration sensor; a receiver at a vehicle body receiving the frame from one wheel and having a second controller for performing wheel position detection; and a wheel speed sensor for detecting a tooth of a gear. The second controller acquires gear information indicating a tooth position; sets a variation allowance based on the tooth position; registers the one wheel with using the variation allowance; sets another variation allowance based on another tooth position when the receiver receives a new frame; and changes the variation allowance to a new variation allowance provided by an overlap portion between the variation allowance and another variation allowance.

5 Claims, 6 Drawing Sheets

(56) References Cited

U.S. PATENT DOCUMENTS

| | | | |
|---|---|---|---|
| 6,489,888 B1 * | 12/2002 | Honeck et al. | 340/442 |
| 6,922,140 B2 * | 7/2005 | Hernando et al. | 340/444 |
| 7,010,968 B2 * | 3/2006 | Stewart et al. | 73/146 |
| 7,336,161 B2 * | 2/2008 | Walraet | 340/442 |
| 7,490,793 B2 * | 2/2009 | Mackness | 244/100 R |
| 7,515,040 B2 * | 4/2009 | Mori et al. | 340/442 |
| 2011/0071737 A1 * | 3/2011 | Greer et al. | 701/49 |
| 2012/0112899 A1 * | 5/2012 | Hannon | 340/445 |
| 2012/0259507 A1 * | 10/2012 | Fink | 701/32.7 |

FOREIGN PATENT DOCUMENTS

| | | |
|---|---|---|
| JP | 3212311 B2 | 9/2001 |
| JP | 2007-015491 A | 1/2007 |
| JP | 2010122023 A | 6/2010 |

* cited by examiner

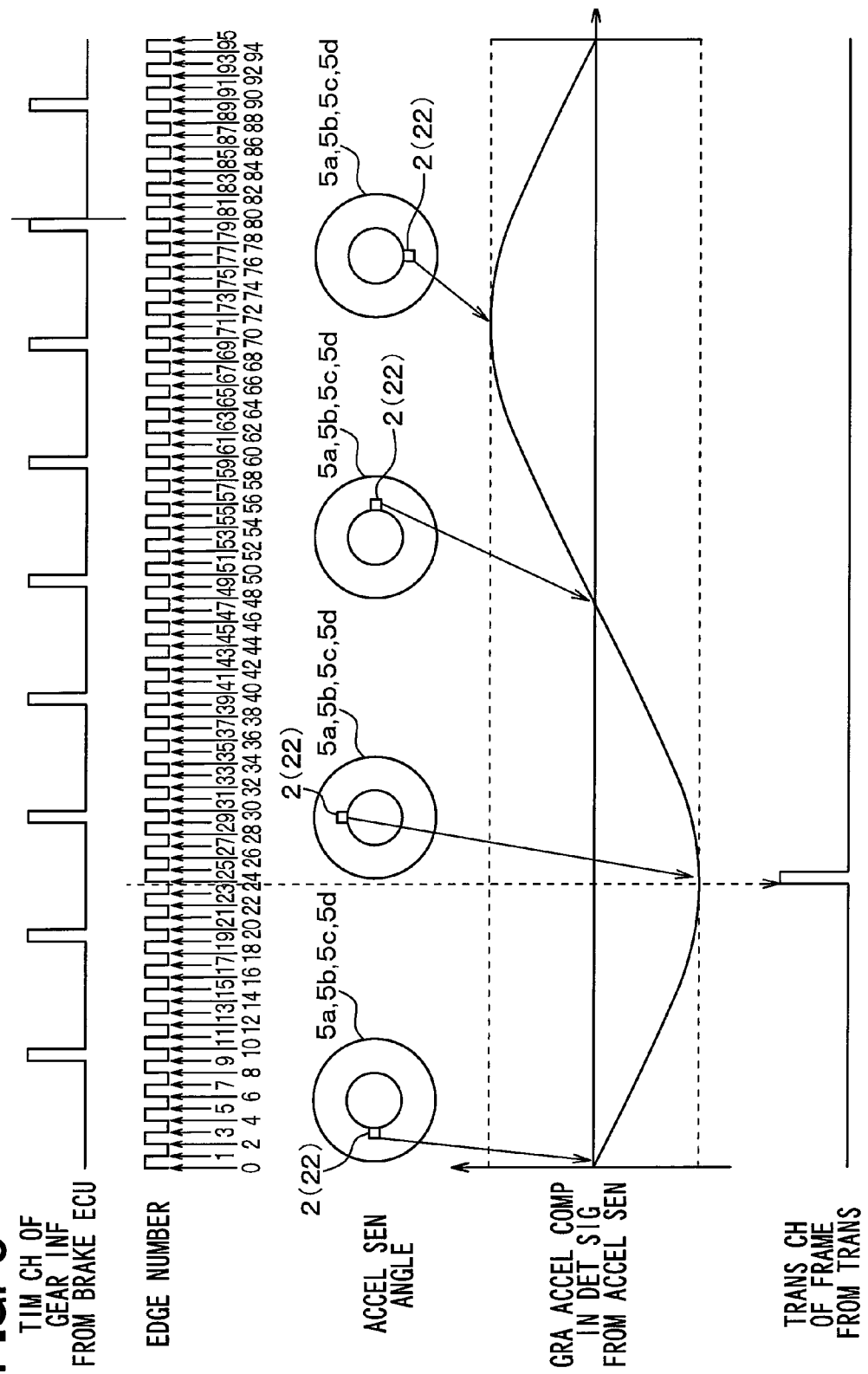

1ST REC

2ND REC

3RD REC

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 68 | 92 | 62 | 78 | — | — | — | — |
| REC 2 | 5.1 | 56 | 42 | 38 | 8 | TRUE | FALSE | TRUE | FALSE |
| REC 3 | 10.3 | 72 | 26 | 42 | 72 | TRUE | | TRUE | |
| REC 4 | 14.3 | 60 | 62 | 22 | 6 | TRUE | | FALSE | |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 38 | 68 | 30 | 50 | — | — | — | — |
| REC 2 | 4.1 | 2 | 78 | 80 | 46 | FALSE | TRUE | FALSE | TRUE |
| REC 3 | 8.3 | 42 | 74 | 14 | 28 | | TRUE | | TRUE |
| REC 4 | 12.4 | 88 | 78 | 52 | 22 | | TRUE | | FALSE |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 62 | 94 | 54 | 76 | — | — | — | — |
| REC 2 | 4.5 | 80 | 66 | 60 | 32 | TRUE | FALSE | TRUE | FALSE |
| REC 3 | 9.0 | 92 | 40 | 64 | 88 | FALSE | | TRUE | |

| REC | TIME (t) | TOOTH POS AT REC (0-95) | | | | WH POS SPE LOGIC (TRUE OR FALSE) | | | |
|---|---|---|---|---|---|---|---|---|---|
| | | FL | FR | RL | RR | FL | FR | RL | RR |
| REC 1 | 0.0 | 36 | 86 | 24 | 62 | — | — | — | — |
| REC 2 | 4.5 | 0 | 6 | 74 | 64 | FALSE | TRUE | FALSE | TRUE |
| REC 3 | 8.6 | 62 | 24 | 30 | 70 | | FALSE | | TRUE |

WHEEL POSITION DETECTOR AND TIRE INFLATION PRESSURE DETECTOR HAVING THE SAME

CROSS REFERENCE TO RELATED APPLICATION APPLICATIONS

This application is a U.S. National Phase Application under 35 U.S.C. 371 of International Application No. PCT/JP2012/081871 filed on Dec. 4, 2012 and published as WO/2013/089045 on Jun. 20, 2013. This application is based on Japanese Patent Application No. 2011-276013 filed on Dec. 16, 2011. The disclosures of all of the above applications are incorporated herein by reference.

TECHNICAL FIELD

The present disclosure relates to a wheel position detector that automatically detects at which position of a vehicle a wheel is mounted. The wheel position detector may be used for a direct-type tire inflation pressure detector that detects a tire inflation pressure by directly attaching a transmitter having a pressure sensor to a wheel mounted with a tire, transmitting a detection result from the pressure sensor via the transmitter, and receiving the detection result by a receiver attached to the vehicle.

BACKGROUND ART

There is known a direct-type tire inflation pressure detector according to the related art. This type of tire inflation pressure detector uses a transmitter that is provided with a sensor such as a pressure sensor and is directly attached to a vehicle mounted with tires. An antenna and a receiver are provided for the vehicle. If the transmitter transmits a detection signal from the sensor, the receiver receives the detection signal at the antenna and detects the tire inflation pressure.

The direct-type tire inflation pressure detector determines whether the data is transmitted from a local vehicle and to which wheel the transmitter is attached. For this purpose, each data transmitted from the transmitter contains ID information that discriminates between a local vehicle and a remote vehicle and identifies a wheel to which the transmitter is attached.

The receiver needs to previously register the ID information about each transmitter in association with each wheel position to be able to locate the transmitter from the ID information contained in the transmission data. If a tire is replaced, the receiver needs to re-register the positional relationship between the transmitter ID information and the wheel. For example, patent document 1 proposes the technological method of automating this registration.

Specifically, the apparatus described in patent document 1 detects that the wheel reaches a specified rotation position based on an acceleration detection signal from an acceleration sensor included in the transmitter provided for a vehicle. The vehicle also detects a rotation position of the wheel when a wireless signal is received from the transmitter. The vehicle monitors a change in a relative angle between the rotation positions to specify the wheel position. This method monitors a change in the relative angle between the wheel rotation position detected by the vehicle and the wheel rotation position detected by the wheel based on the deviation in the specified number of pieces of data. The method specifies the wheel position by determining that a variation exceeds an allowable value with reference to an initial value.

However, the method described in patent document 1 specifies the wheel position based on whether a variation belongs to an allowable range defined by a specified allowable value with reference to an initial value. The method cannot specify the wheel position while the variation belongs to the allowable range. A certain amount of data is needed because the method specifies the wheel position based on the standard deviation. The method cannot specify the wheel position until the necessary amount of data is acquired. Accordingly, specifying the wheel position consumes the time.

CITATION LIST

Patent Literature

[PTL 1]
JP-A-2010-122023

SUMMARY

It is an object of the present disclosure to provide a wheel position detector and a tire inflation pressure detector having a wheel position detector capable of specifying a wheel position in a shorter period of time.

According to a first aspect of the present disclosure, a wheel position detector used for a vehicle having a plurality of wheels, each of which includes a tire mounted on a vehicle body, the wheel position detector includes: a transmitter that is arranged at each wheel, and includes a first control portion for generating and transmitting a frame including specific identification information; and a receiver that is arranged at the vehicle body, receives the frame transmitted from the transmitter of one of the wheels via a reception antenna at a reception time, and includes a second control portion for performing wheel position detection of specifying the one of the wheels and storing a relationship between the one of wheels and the specific identification information. Each transmitter further includes an acceleration sensor that outputs a detection signal corresponding to acceleration, which has a gravity acceleration component varying with a rotation of a respective wheel mounting the transmitter. The first control portion of the transmitter at each wheel detects an angle of the transmitter based on the gravity acceleration component in the detection signal from the acceleration sensor. Each wheel has a central axis as a center of the wheel, a predetermined position of a circumference of the wheel is referred as a zero degree position, and the angle of the transmitter is defined by the transmitter, the center and the zero angle position. The transmitter at each wheel repeatedly transmits the frame at every time the angle of the transmitter reaches a specified value. The wheel position detector further includes: a wheel speed sensor for each wheel that detects a tooth of a gear, which rotates in association with the wheel. The gear of each wheel has an outer periphery, which provides teeth as conductive portions and a plurality of intermediate portions between the teeth so that conductive portions and the intermediate portions are alternately arranged along the outer periphery, and a magnetic resistance of tooth is different from a magnetic resistance of an intermediate portion. The second control portion acquires gear information indicating a tooth position of the gear based on a detection signal from the wheel speed sensor. The second control portion sets a variation allowance based on the tooth position when the receiver receives the frame. The second control portion excludes a certain wheel from a candidate of the one of wheels mounting the transmitter that transmits the frame when the receiver receives the frame, and the tooth position of the certain wheel is not disposed within the variation allowance after the variation allowance is set. The second control portion registers a remaining wheel as the one of wheels mounting the transmitter that transmits the frame. The second control portion changes the variation allowance at every time the receiver receives the frame. The second control portion sets another variation allowance based on another tooth position when the receiver receives a new frame. The second control portion changes the variation allowance to a new variation allowance, which is provided by an overlap portion between the variation allowance and another variation allowance.

In the above wheel position detector, the new variation allowance can be limited to the overlap. Therefore, the wheel position detector can fast and accurately specify wheel positions.

According to a second aspect of the present disclosure, a tire inflation pressure detector includes the wheel position detector according to the first aspect of the present disclosure. The transmitter of each wheel further includes a sensing portion for outputting a detection signal corresponding to a tire inflation pressure of the tire. The first control portion of each wheel processes the detection signal from the sensing portion to acquire information about the tire inflation pressure, and the transmitter stores the information about the tire inflation pressure in the frame, and transmits the frame to the receiver. The second control portion in the receiver detects the tire inflation pressure of the tire on each wheel based on the information about the tire inflation pressure.

The tire inflation pressure detector can fast and accurately detects the tire inflation pressure.

BRIEF DESCRIPTION OF THE DRAWINGS

The above and other objects, features and advantages of the present disclosure will become more apparent from the following detailed description made with reference to the accompanying drawings. In the drawings:

FIG. 3 is a timing chart illustrating the wheel position detection;

FIG. 6A illustrates a result of evaluating wheel positions;
FIG. 6B illustrates a result of evaluating wheel positions;
FIG. 6C illustrates a result of evaluating wheel positions;
FIG. 6D illustrates a result of evaluating wheel positions.

DESCRIPTION OF EMBODIMENTS

First Embodiment

Figure 1:
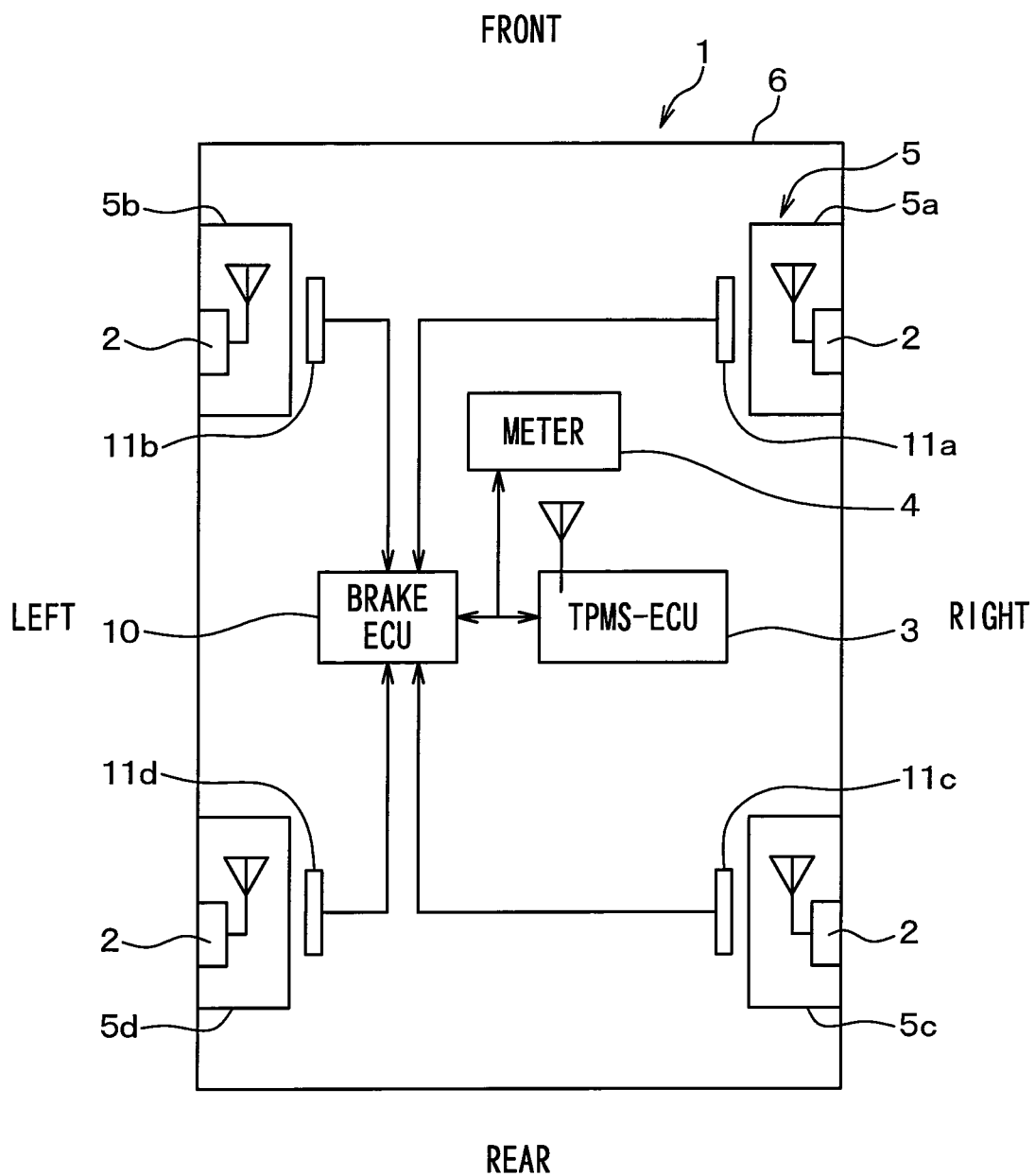
FIG. 1 illustrates an overall configuration of a tire inflation pressure detector including a wheel position detector according to a first embodiment.

The first embodiment of the disclosure will be described with reference to the accompanying drawings. FIG. 1 illustrates an overall configuration of a tire inflation pressure detector including a wheel position detector according to the first embodiment of the disclosure. The top of FIG. 1 corresponds to the front of a vehicle 1. The bottom of FIG. 1 corresponds to the rear thereof. The following describes the tire inflation pressure detector according to the embodiment with reference to FIG. 1.

As illustrated in FIG. 1, the tire inflation pressure detector is attached to the vehicle 1 and includes a transmitter 2, an ECU 3 for the tire inflation pressure detector, and a meter 4. The ECU 3 functions as a receiver and is hereinafter referred to as a TPMS-ECU (Tire Pressure Monitoring System ECU). To specify a wheel position, the wheel position detector uses the transmitter 2 and the TPMS-ECU 3 provided for the tire inflation pressure detector. In addition, the wheel position detector acquires gear information from a brake control ECU (hereinafter referred to as a brake ECU) 10. The gear information is generated from detection signals of wheel speed sensors 11a through 11d respectively provided for gears 5 (5a through 5d).

Figure 2A:
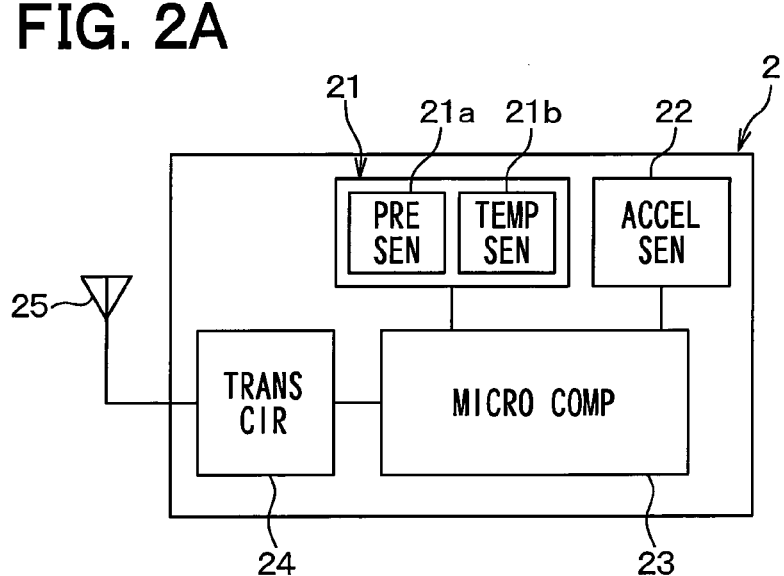
FIG. 2A illustrates a block configuration of a transmitter and a receiver.
Figure 2B:
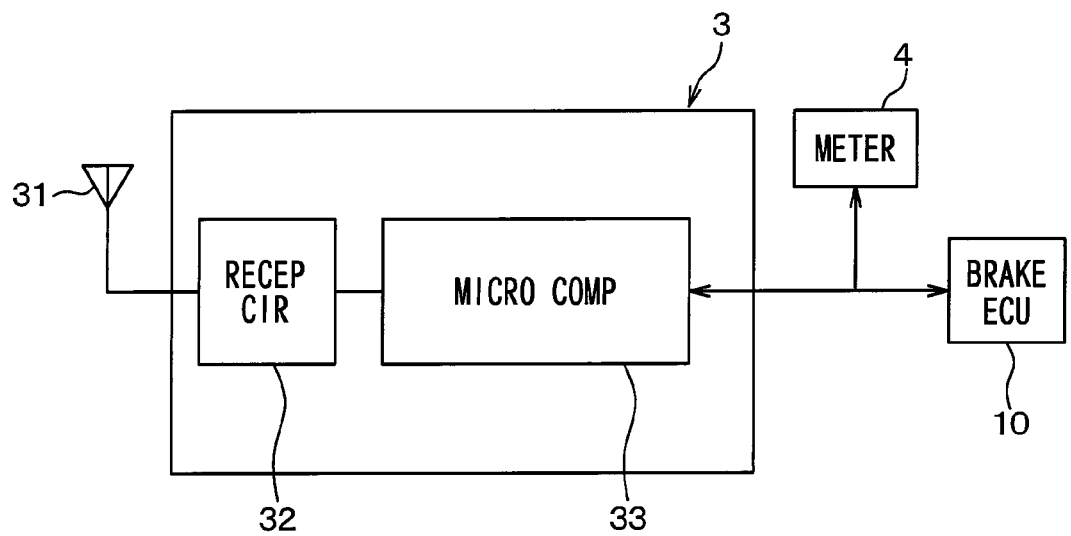
FIG. 2B illustrates a block configuration of a transmitter and a receiver.

As illustrated in FIG. 1, the transmitter 2 is attached to each of the wheels 5a through 5d. The transmitter 2 detects inflation pressures of tires attached to the wheels 5a through 5d. The transmitter 2 stores information about the tire inflation pressure as a detection result in a frame and transmits the frame. The TPMS-ECU 3 is attached to a vehicle body 6 of the vehicle 1. The TPMS-ECU 3 receives a frame transmitted from the transmitter 2 and detects a wheel position and a tire inflation pressure by performing various processes and operations based on a detection signal stored in the frame. The transmitter 2 generates a frame according to FSK (frequency-shift keying), for example. The receiver 3 demodulates the frame to read data in the frame and detects the wheel position and the tire inflation pressure. FIGS. 2A and 2B illustrate block configurations of the transmitter 2 and the receiver 3.

As illustrated in FIG. 2A, the transmitter 2 includes a sensing portion 21, an acceleration sensor 22, a microcomputer 23, a transmission circuit 24, and a transmission antenna 25. A battery (not shown) supplies power to drive these components.

The sensing portion 21 includes a diaphragm-type pressure sensor 21a and a temperature sensor 21b, for example. The sensing portion 21 outputs a detection signal corresponding to the tire inflation pressure or the temperature. The acceleration sensor 22 detects the position of the sensor itself at the wheels 5a through 5d where the transmitter 2 is attached. That is, the acceleration sensor 22 detects the position of the transmitter 2 or the vehicle speed. For example, the acceleration sensor 22 according to the embodiment outputs a detection signal corresponding to the acceleration acting on the rotating wheels 5a through 5d, more specifically, the acceleration in the radial direction of each of the wheels 5a through 5d, namely, in both directions perpendicular to the circumferential direction of the wheels.

The microcomputer 23 includes a control portion (first control portion) and is configured according to a known technology. The microcomputer 23 performs a specified process according to a program stored in the memory of the control portion. The memory in the control portion stores discrete ID information that contains transmitter-specific identification information to specify each transmitter 2 and vehicle-specific identification information to specify the local vehicle.

The microcomputer 23 receives a detection signal concerning the tire inflation pressure from the sensing portion 21, processes the signal and modifies it as needed, and stores information about the tire inflation pressure as well as the ID information about each transmitter 2 in the frame. The microcomputer 23 monitors the detection signal from the acceleration sensor 22 to detect the vehicle speed or the position of each transmitter 2 attached to the wheels 5a through 5d. The microcomputer 23 generates a frame and allows the transmission circuit 24 to transmit the frame (data) to the receiver 3 via the transmission antenna 25 based on the result of detecting the vehicle speed or the position of the transmitter 2.

Specifically, the microcomputer 23 starts transmitting the frame on the assumption that the vehicle 1 is running. The microcomputer 23 repeatedly transmits the frame based on the detection signal from the acceleration sensor 22 each time the acceleration sensor 22 reaches a specified angle. The microcomputer 23 assumes the vehicle to be running based on the result of detecting the vehicle speed. The microcomputer 23 determines the angle of the acceleration sensor 22 based on the result of detecting the position of the transmitter 2 while the position thereof depends on the detection signal from the acceleration sensor 22.

The microcomputer 23 detects the vehicle speed using the detection signal from the acceleration sensor 22. The microcomputer 23 assumes the vehicle 1 to be running when the vehicle speed reaches a specified value (e.g., 5 km/h) or larger. The output from the acceleration sensor 22 includes the centrifugal acceleration, namely, the acceleration based on a centrifugal force. The vehicle speed can be calculated by integrating the centrifugal acceleration and multiplying a coefficient. The microcomputer 23 calculates the centrifugal acceleration by excluding a gravity acceleration component from the output of the acceleration sensor 22 and calculates the vehicle speed based on the centrifugal acceleration.

The acceleration sensor 22 outputs detection signals according to rotations of the wheels 5a through 5d. While the vehicle is running, the detection signal contains a gravity acceleration component and indicates the amplitude corresponding to the wheel rotation. For example, the detection signal indicates the maximum negative amplitude if the transmitter 2 is positioned above a central axis of each of the wheels 5a through 5d. The detection signal indicates zero amplitude if the transmitter 2 levels with the central axis. The detection signal indicates the maximum positive amplitude if the transmitter 2 is positioned below the central axis. The amplitude can be used to find the position of the acceleration sensor 22 or an angle for the position of the transmitter 2. For example, an angle formed by the acceleration sensor 22 can be found, assuming the angle to be 0° when the acceleration sensor 22 is positioned above the central axis of each of the wheels 5a through 5d.

Each transmitter 2 starts transmitting the frame at the same time when the vehicle speed reaches a specified value or when the acceleration sensor 22 reaches a specified angle after the vehicle speed reaches the specified value. The transmitter 2 repeatedly transmits the frame at the transmission timing when an angle formed by the acceleration sensor 22 equals the angle for the first frame transmission. On the other hand, the transmission timing may be more favorable if the transmitter 2 transmits the frame only once in a specified time period (e.g., 15 seconds) in consideration of the battery life instead of transmitting the frame each time the specified angle is reached.

The transmission circuit 24 transmits the frame transmitted from the microcomputer 23 to the receiver 3 via the transmission antenna 25. The transmission circuit 24 functions as an output portion. The frame transmission uses an RF bandwidth radio wave, for example.

The transmitter 2 according to the above-mentioned configuration is attached to an air intake valve on each of the wheels 5a through 5d and is positioned so as to expose the sensing portion 21 inside the tire, for example. The transmitter 2 detects the corresponding tire inflation pressure. As described above, when the vehicle speed exceeds a specified value, the transmitter 2 repeatedly transmits the frame via the transmission antenna 25 provided for each transmitter 2 each time the acceleration sensor 22 for each of the wheels 5a through 5d reaches a specified angle. After that, the transmitter 2 may repeatedly transmit the frame each time the acceleration sensor 22 for each of the wheels 5a through 5d reaches a specified angle. However, it is desirable to elongate the transmission interval in consideration of the battery life. For this purpose, wheel-positioning mode changes to periodic transmission mode when the time needed to determine the wheel position expires. The transmitter 2 then transmits the frame at a longer cycle (e.g., every one minute) to periodically transmit a signal concerning the tire inflation pressure to the receiver 3. For example, a random delay may be provided for each transmitter 2 to provide different transmission timings for the transmitters 2. This can prevent the TPMS-ECU 3 from disabling the reception due to interference of radio waves from the transmitters 2.

As illustrated in FIG. 2B, the TPMS-ECU 3 includes a reception antenna 31, a reception circuit 32, and a microcomputer 33. The TPMS-ECU 3 acquires gear information from the brake ECU 10 via interior LAN such as CAN (to be described) to acquire a tooth position indicated by the number of edges of teeth (or the number of teeth) of a gear rotating with each of the wheels 5a through 5d.

The reception antenna 31 receives frames transmitted from the transmitters 2. The reception antenna 31 is fixed to the vehicle body 6. The reception antenna 31 may be provided as an internal antenna placed in the TPMS-ECU 3 or as an external antenna using the wiring extended from the body.

The reception circuit 32 is supplied with transmission frames that are transmitted from the transmitters 2 and are received at the reception antenna 31. The reception circuit 32 functions as an input portion that transmits the frames to the microcomputer 33. The reception circuit 32 receives a signal (frame) via the reception antenna 31 and then transmits the received signal to the microcomputer 33.

The microcomputer 33 is equivalent to a second control portion and performs a wheel position detection process in accordance with a program stored in the memory of the microcomputer 33. Specifically, the microcomputer 33 detects the wheel position based on relationship between information acquired from the brake ECU 10 and reception timing to receive a transmission frame from each transmitter 2. The microcomputer 33 acquires gear information from the brake ECU 10 at a specified cycle (e.g., 10 ms). The gear information is generated from the wheel speed sensors 11a through 11d respectively provided for the wheels 5a through 5d.

The gear information indicates the tooth position of a gear rotating with the wheels 5a through 5d. The wheel speed sensors 11a through 11d are configured as electromagnetic pick-up sensors provided against the gear teeth, for example. The wheel speed sensors 11a through 11d vary a detection signal in response to the passage of gear teeth. This type of wheel speed sensors 11a through 11d outputs a detection signal using a square-wave pulse corresponding to the tooth passage. A rise and a fall of the square-wave pulse represent the passage of gear tooth edges. Accordingly, the brake ECU 10 counts the number of gear tooth edges or the number of edge passages based on the number of rises and falls in the detection signals from the wheel speed sensors 11a through 11d. The brake ECU 10 notifies the microcomputer 33 of the number of tooth edges as the gear information representing the tooth position at the specified cycle. The microcomputer 33 can thereby identify which tooth of the gear passes at the timing.

The number of tooth edges is reset each time the gear makes one rotation. For example, suppose that the gear has 48 teeth. The edges are numbered from 0 to 95 and 96 edges are counted in total. When the count value reaches 95, it returns to 0 and the count resumes.

The brake ECU 10 may notify the microcomputer 33 of the number of teeth equivalent to the number of counted tooth passages as the gear information instead of the number of gear tooth edges as described above. The brake ECU 10 may notify the microcomputer 33 of the number of edges or teeth that have passed during the specified cycle. The brake ECU 10 may allow the microcomputer 33 to add the number of edges or teeth passed during the specified cycle to the most recent number of edges or teeth. The microcomputer 33 may count the number of edges or teeth at the cycle. Namely, the microcomputer 33 just needs to be able to finally acquire the number of edges or teeth as the gear information at the cycle. The brake ECU 10 resets the number of gear tooth edges or the number of teeth each time the power is turned off. The brake ECU 10 restarts the measurement simultaneously with a power-on sequence or when the power is turned on and a specified vehicle speed is reached. Therefore, the same gear is represented with the same number of edges or teeth while the power is off even if the number of edges or teeth is reset each time the power is turned off.

The microcomputer 33 measures the reception timing when receiving a frame transmitted from each transmitter 2. The microcomputer 33 detects wheel positions based on the number of gear edges or teeth at the timing to receive the frame out of the acquired number of gear edges or teeth. The microcomputer 33 is thereby capable of detecting wheel positions to specify to which of the wheels 5a through 5d each transmitter 2 is attached. The method of detecting wheel positions will be described in detail later.

Based on a wheel position detection result, the microcomputer 33 stores the ID information about the transmitters 2 and the positions of the wheels 5a through 5d mounted with the transmitters 2 in association with each other. After that, the microcomputer 33 detects the tire inflation pressures of the wheels 5a through 5d based on the ID information stored in the frame transmitted from each transmitter 2 and data about the tire inflation pressure. The microcomputer 33 outputs an electric signal corresponding to the tire inflation pressure to the meter 4 via the interior LAN such as CAN. For example, the microcomputer 33 compares the tire inflation pressure with a specified threshold value Th to detect a decrease in the tire inflation pressure. The microcomputer 33 outputs the detected decrease to the meter 4. The meter 4 is thereby notified of which of the four wheels 5a through 5d decreases the tire inflation pressure.

The meter 4 functions as an alarm portion. As illustrated in FIG. 1, the meter 4 is provided where a driver can view. For example, the meter 4 is configured as a meter display included in an instrument panel of the vehicle 1. Suppose that the microcomputer 33 in the receiver 3 transmits a signal representing a decrease in the tire inflation pressure. When receiving this signal, the meter 4 provides an indication representing a decrease in the tire inflation pressure while specifying any of the wheels 5a through 5d. The meter 4 thereby notifies the driver of a decrease in the tire inflation pressure on a specific wheel.

The following describes operations of the tire inflation pressure detector according to the embodiment. The description below is divided into wheel position detection and tire inflation pressure detection performed by the tire inflation pressure detector.

Figure 4:
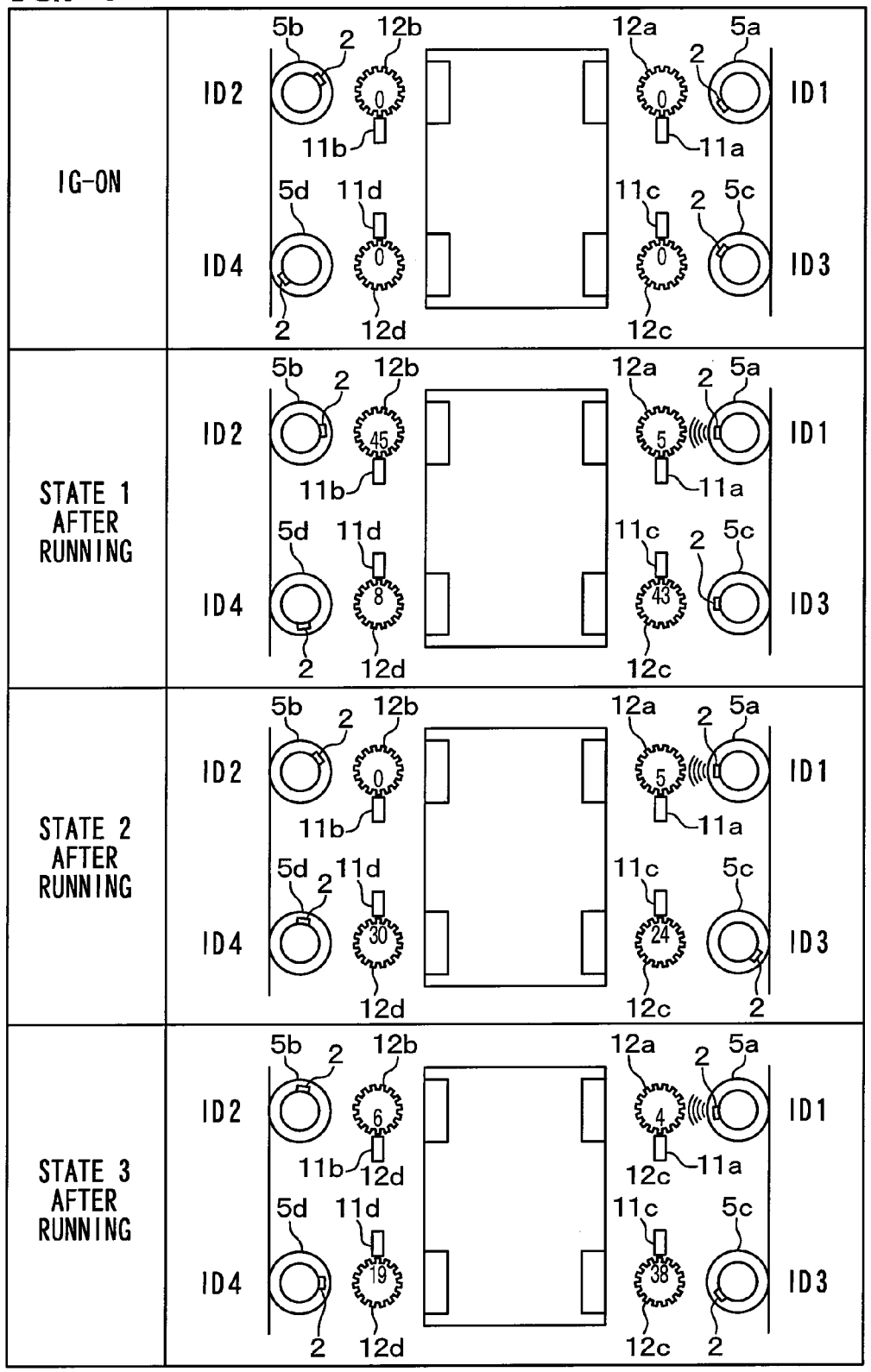
FIG. 4 illustrates changes of gear information.
Figure 5A:
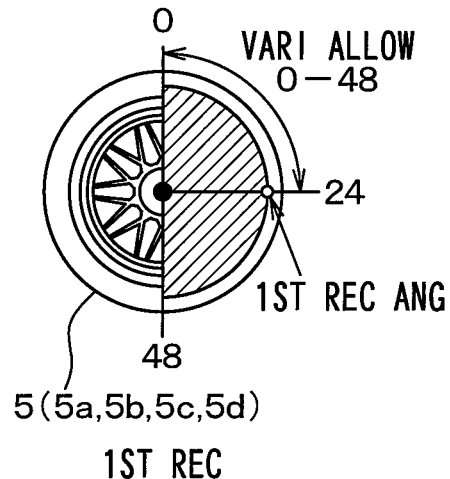
FIG. 5A schematically illustrates the logic to determine a wheel position.
Figure 5B:
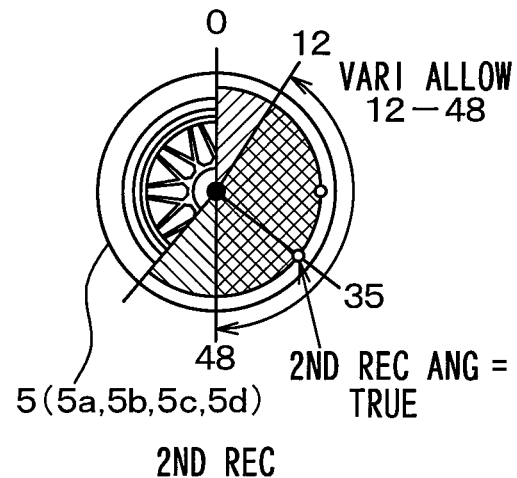
FIG. 5B schematically illustrates the logic to determine a wheel position.
Figure 5C:
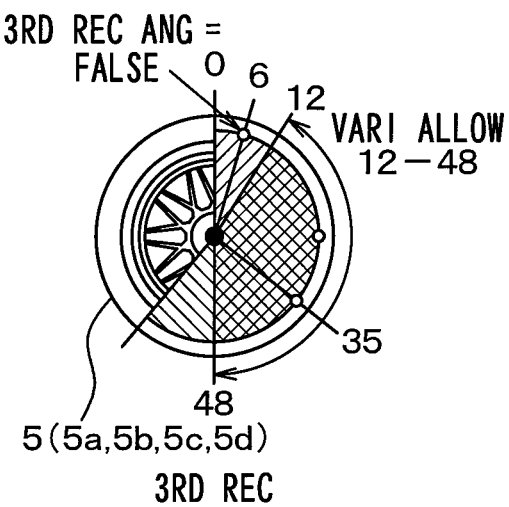
FIG. 5C schematically illustrates the logic to determine a wheel position.

The wheel position detection will be described first. FIG. 3 is a timing chart illustrating the wheel position detection. FIG. 4 illustrates changes of gear information. FIGS. 5A, 5B, and 5C schematically illustrate the logic to determine a wheel position. FIGS. 6A, 6B, 6C, and 6D illustrate results of evaluating wheel positions. With reference to these drawings, a specific method of the wheel position detection will be described.

On the transmitter 2, the microcomputer 23 monitors a detection signal from the acceleration sensor 22 at a specified sampling cycle based on the power supplied from the battery. The microcomputer 23 thereby detects the vehicle speed and the angle of the acceleration sensor 22 on each of the wheels 5a through 5d. When the vehicle speed reaches a specified value, the microcomputer 23 repeatedly transmits a frame at the timing when the acceleration sensor 22 reaches a specified angle. For example, the microcomputer 23 allows each transmitter 22 to transmit the frame assuming that the specified angle is available when the vehicle speed reaches the specified value or assuming that the start timing is available when the vehicle speed reaches the specified value and then the acceleration sensor 22 reaches the specified angle. The microcomputer 23 repeatedly transmits the frame at the transmission timing when the angle formed by the acceleration sensor 22 equals the angle for the first frame transmission.

A sine curve as illustrated in FIG. 3 results from extracting gravity acceleration components of the detection signal from the acceleration sensor 22. The angle of the acceleration sensor 22 is found based on the sine curve. The frame is transmitted each time the acceleration sensor 22 reaches the same angle based on the sine curve.

The TPMS-ECU 3 acquires the gear information from the brake ECU 10 at a specified cycle (e.g., 10 ms). The gear information is supplied from the wheel speed sensors 11a through 11d respectively provided for the wheels 5a through 5d. The TPMS-ECU 3 measures the reception timing when receiving a frame transmitted from each transmitter 2. The TPMS-ECU 3 acquires the number of gear edges or teeth at the timing to receive the frame out of the acquired number of gear edges or teeth.

The timing to receive the frame transmitted from each transmitter 2 does not always coincide with the cycle to acquire the gear information from the brake ECU 10. For this reason, the number of gear edges or teeth at the timing to receive the frame may be represented using the number of gear edges or teeth that is indicated in the gear information and is acquired at the cycle to acquire the gear information from the brake ECU 10 and most approximate to the timing to receive the frame, namely, immediately before or after the cycle to receive the frame. The number of gear edges or teeth at the timing to receive the frame may be calculated using the number of gear edges or teeth that is indicated in the gear information acquired at the cycle to acquire the gear information from the brake ECU 10 and to occur immediately before and after the timing to receive the frame. For example, there is available an intermediate value for the number of gear edges or teeth that is indicated in the gear information acquired immediately before and after the timing to receive the frame. The intermediate value may be used as the number of gear edges or teeth at the timing to receive the frame.

The tire inflation pressure detector repeats the operation to acquire the number of gear edges or teeth at the timing to receive the frame each time the frame is received. The tire inflation pressure detector performs the wheel position detection based on the number of gear edges or teeth at the timing to receive the frame that is acquired. Specifically, the tire inflation pressure detector performs the wheel position detection by determining whether a variation in the number of gear edges or teeth at the timing to receive the frame remains in an allowable range that is specified based on the number of gear edges or teeth at the previous reception timing.

If the frame is received from a wheel, the transmitter 2 corresponding to the wheel transmits the frame each time the acceleration sensor 22 reaches the specified angle. The tooth position almost matches the previous one since the tooth position is indicated by the number of gear edges or teeth at the timing to receive the frame. Consequently, a variation in the number of gear edges or teeth at the timing to receive the frame is small and remains in the allowable range. This also applies to a case of receiving the frame more than once. A variation in the number of gear edges or teeth at the timing to receive the frames remains in the allowable range that is settled at the first frame reception timing. If the frame is not received from a wheel, the tooth position varies since the tooth position is indicated by the number of gear edges or teeth at the timing to receive the frame sporadically transmitted from the transmitter 2 corresponding to the wheel.

The gears for the wheel speed sensors 11a through 11d rotate to interlock with the wheels 5a through 5d. Therefore, the wheel from which the frame is received hardly causes a variation in the tooth position that is indicated by the number of gear edges or teeth at the timing to receive the frame. However, the wheels 5a through 5d cannot rotate in completely the same state because rotation states of the wheels 5a through 5d vary with road situations, turning, or a lane change. Therefore, the wheel from which no frame is received causes a variation in the tooth position that is indicated by the number of gear edges or teeth at the timing to receive the frame.

As illustrated in FIG. 4, the gears 12a through 12d indicate edge count 0 when an ignition switch (IG) is turned on initially. After the vehicle starts running, the frame is successively received from a given wheel. A wheel different from that wheel causes a variation in the tooth position indicated by the number of gear edges or teeth at the timing to receive the frame. The tire inflation pressure detector performs the wheel position detection by determining whether the variation remains in the allowable range.

As illustrated in FIG. 5A, for example, the transmitter 2 is positioned to a first reception angle when the frame is transmitted for the first time. Suppose that a variation allowance represents a variation allowable for the number of gear edges or teeth and is equivalent to a 180° range centered on the first reception angle, namely, a ±90° range with reference to the first reception angle. The variation allowance is equivalent to ±24 edges centered on the number of edges at the first reception or is equivalent to ±12 teeth centered on the number of teeth at the first reception. As illustrated in FIG. 5B, the number of gear edges or teeth at the second frame reception satisfies the variation allowance determined at the first frame reception. In this case, the wheel corresponding to the number of edges or teeth is likely to match the wheel used to transmit the frame and is assumed TRUE.

Also in this case, the variation allowance is settled centered on a second reception angle as an angle of the transmitter 2 at the second frame reception and is equivalent to 180° centered on the second reception angle, namely, ±90°. A new variation allowance ranges between edge counts 12 and 48. This is an overlap between the previous variation allowance, namely, the variation allowance of 180° centered on the first reception angle (±90°) and the variation allowance of 180° centered on the second reception angle (±90°). The new variation allowance can be limited to the new overlapped range.

As illustrated in FIG. 5C, the number of gear edges or teeth at the third frame reception exceeds the variation allowance determined by the first and second frame receptions. In this case, the wheel corresponding to the number of edges or teeth is likely to differ from the wheel used to transmit the frame and is assumed FALSE. The number of gear edges or teeth at the third frame reception is assumed FALSE even if it satisfies the variation allowance determined by the first frame reception but exceeds the variation allowance determined by the first and second frame receptions. This enables to determine to which of the wheels 5a through 5d the transmitter 2 used to transmit the received frame is attached.

As illustrated in FIG. 6A, the tire inflation pressure detector acquires the number of gear edges or teeth for a frame containing ID1 as identification information each time the frame is received. The tire inflation pressure detector stores the acquired information according to the corresponding wheels such as front left wheel FL, front right wheel FR, rear left wheel RL, and rear right wheel RR. Each time the frame is received, the tire inflation pressure detector determines whether the acquired number of gear edges or teeth satisfies the variation allowance. The tire inflation pressure detector excludes a wheel not satisfying the variation allowance from the candidate wheels possibly mounted with the transmitter 2 that transmitted the frame. If a wheel finally remains not excluded, the tire inflation pressure detector registers the wheel, assuming it mounted with the transmitter 2 that transmitted the frame. If the frame contains ID1, the tire inflation pressure detector excludes front right wheel RF, rear right wheel RR, and rear left wheel RL in this order from the candidates. The tire inflation pressure detector finally registers front left wheel FL, assuming it mounted with the transmitter 2 that transmitted the frame.

As illustrated in FIGS. 6B through 6D, the tire inflation pressure detector performs the same process as for the frame containing ID1 on the frames containing ID2 through ID4 as identification information. In this manner, the tire inflation pressure detector can specify the wheel mounted with the transmitter 2 that transmitted the frame. The tire inflation pressure detector can specify all the four wheels mounted with the transmitters 2.

As described above, the frame specifies to which of the wheels 5a through 5d the transmitter 2 is attached. The microcomputer 33 stores the ID information about the transmitter 2 used to transmit the frame in association with the position of the wheel to which the transmitter 2 is attached.

The TPMS-ECU 3 receives the frame transmitted when the vehicle speed reaches the specified value. The TPMS-ECU 3 thereby stores the gear information at the reception timing. The TPMS-ECU 3 discards the existing gear information when the vehicle speed becomes lower than a specified value (e.g., 5 km/h) to determine whether the vehicle stops. When the vehicle starts running again, the tire inflation pressure detector newly performs the wheel position detection as described above.

After performing the wheel position detection, the tire inflation pressure detector performs the tire inflation pressure detection. Specifically, each transmitter 2 transmits the frame at a specified cycle during the tire inflation pressure detection. The receiver 3 receives the frames for the four wheels each time the transmitter 2 transmits the frame. Based on the ID information stored in each frame, the TPMS-ECU 3 determines which of the transmitters 2 attached to the wheels 5a through 5d transmitted the frame. The TPMS-ECU 3 detects the tire inflation pressures of the wheels 5a through 5d according to the information about the tire inflation pressure. The TPMS-ECU 3 can thereby detect a decrease in the tire inflation pressures of the wheels 5a through 5d and determine which of the wheels 5a through 5d decreases the tire inflation pressure. The TPMS-ECU 3 notifies the meter 4 of the decrease in the tire inflation pressure. The meter 4 provides an indication representing the decrease in the tire inflation pressure while specifying any of the wheels 5a through 5d. The meter 4 thereby notifies the driver of the decrease in the tire inflation pressure on a specific wheel.

As described above, the wheel position detector acquires the gear information indicating the tooth positions of the gears 12a through 12d based on detection signals from the wheel speed sensors 11a through 11d that detect passage of teeth of the gears 12a through 12d rotating with the wheels 5a through 5d. The variation allowance is settled based on the tooth position at the timing to receive the frame. After the variation allowance is settled, a wheel may indicate the tooth position in excess of the variation allowance at the timing to receive the frame. The wheel position detector excludes that wheel from the candidate wheels possibly mounted with the transmitter 2 that transmitted the frame. The wheel position detector registers the remaining wheel as the wheel mounted with the transmitter 2 that transmitted the frame. The wheel position detector can specify the wheel positions without using a large amount of data.

A new variation allowance is assumed an overlap between the variation allowance based on the tooth position at the timing to receive the frame and the variation allowance settled at the timing to receive the previous frame. The new variation allowance can be limited to the overlap. Therefore, the wheel position detector can fast and accurately specify wheel positions.

The frame is transmitted when the vehicle speed exceeds the specified value. The acceleration sensor 22 detects positions of the transmitters 2 at the wheels 5a through 5d. The wheel position detector can perform the wheel position detection immediately after the vehicle 1 starts running though the wheel position detection is available only after the vehicle 1 starts running. The wheel position detection is available without the need for a trigger device unlike wheel position detection based on the intensity of a received signal output from the trigger device.

Other Embodiments

The above-mentioned embodiment changes the variation allowance each time the frame is received, thus gradually limiting the variation allowance. The variation allowance is always settled centered on the tooth position. It is possible to change the variation allowance settled centered on the tooth position. For example, a variation in tooth positions may increase as the vehicle speed increases. The variation allowance can be settled more appropriately by increasing the variation allowance as the vehicle speed increases. Increasing a sampling cycle for the acceleration sensor 22 to detect the acceleration degrades the timing detection accuracy when the acceleration sensor 22 reaches the specified angle. The variation allowance can be settled more appropriately by varying it accordingly. In this case, the transmitter 2 keeps track of sampling cycles, for example. The transmitter 2 can transmit the frame containing data that determines the variation allowance size.

The above-mentioned embodiment transmits the frame at the angle of 0° when the acceleration sensor 22 is positioned toward the top with reference to the central axis of each of the wheels 5a through 5d. However, this is just an example. The angle of 0° just needs to be ensured at any position of the wheel in the circumferential direction.

According to the above-mentioned embodiment, the TPMS-ECU 3 acquires the gear information from the brake ECU 10. However, another ECU may acquire the gear information since the TPMS-ECU 3 can acquire the number of gear tooth edges or teeth as the gear information. A detection signal from the wheel speed sensors 11a through 11d may be input to acquire the number of gear tooth edges or teeth from the detection signal. According to the above-mentioned embodiment, the TPMS-ECU 3 and the brake ECU 10 are configured as separate ECUs but may be configured as an integrated ECU. In this case, the ECU is directly supplied with a detection signal from the wheel speed sensors 11a through 11d and acquires the number of gear tooth edges or teeth from the detection signal. In this case, the number of gear tooth edges or teeth can be always acquired. The wheel position detection can be performed based on the gear information just at the frame reception timing unlike the case of acquiring the information at the specified cycle.

While the above-mentioned embodiment has described the wheel position detector provided for the vehicle 1 having the four wheels 5a through 5d, the disclosure is also applicable to a vehicle having more wheels.

According to the disclosure, the wheel speed sensors 11a through 11d just need to detect the passage of teeth of gears rotating with the wheels 5a through 5d. Therefore, the gear just needs to be configured to provide different magnetic resistances by alternating a tooth having a conductive outer periphery and a portion between teeth. The gear is not limited to a general structure whose outer periphery is configured as an indented outer edge and forms a succession of conductive protrusions and non-conductive spaces. The gear includes a rotor switch whose outer periphery is configured as a conductive portion and a non-conductive insulator (see JP-A-H10-1998-048233), for example.

The above disclosure has the following aspects.

According to a first aspect of the present disclosure, a wheel position detector used for a vehicle having a plurality of wheels, each of which includes a tire mounted on a vehicle body, the wheel position detector includes: a transmitter that is arranged at each wheel, and includes a first control portion for generating and transmitting a frame including specific identification information; and a receiver that is arranged at the vehicle body, receives the frame transmitted from the transmitter of one of the wheels via a reception antenna at a reception time, and includes a second control portion for performing wheel position detection of specifying the one of the wheels and storing a relationship between the one of wheels and the specific identification information. Each transmitter further includes an acceleration sensor that outputs a detection signal corresponding to acceleration, which has a gravity acceleration component varying with a rotation of a respective wheel mounting the transmitter. The first control portion of the transmitter at each wheel detects an angle of the transmitter based on the gravity acceleration component in the detection signal from the acceleration sensor. Each wheel has a central axis as a center of the wheel, a predetermined position of a circumference of the wheel is referred as a zero degree position, and the angle of the transmitter is defined by the transmitter, the center and the zero angle position. The transmitter at each wheel repeatedly transmits the frame at every time the angle of the transmitter reaches a specified value. The wheel position detector further includes: a wheel speed sensor for each wheel that detects a tooth of a gear, which rotates in association with the wheel. The gear of each wheel has an outer periphery, which provides teeth as conductive portions and a plurality of intermediate portions between the teeth so that conductive portions and the intermediate portions are alternately arranged along the outer periphery, and a magnetic resistance of tooth is different from a magnetic resistance of an intermediate portion. The second control portion acquires gear information indicating a tooth position of the gear based on a detection signal from the wheel speed sensor. The second control portion sets a variation allowance based on the tooth position when the receiver receives the frame. The second control portion excludes a certain wheel from a candidate of the one of wheels mounting the transmitter that transmits the frame when the receiver receives the frame, and the tooth position of the certain wheel is not disposed within the variation allowance after the variation allowance is set. The second control portion registers a remaining wheel as the one of wheels mounting the transmitter that transmits the frame. The second control portion changes the variation allowance at every time the receiver receives the frame. The second control portion sets another variation allowance based on another tooth position when the receiver receives a new frame. The second control portion changes the variation allowance to a new variation allowance, which is provided by an overlap portion between the variation allowance and another variation allowance.

A wheel may indicate the tooth position in excess of the variation allowance at the frame reception timing. The wheel position detector can exclude such a wheel from the candidate wheels possibly mounted with the transmitter that transmitted the frame. The wheel position detector can specify the wheel positions without using a large amount of data. A new variation allowance is assumed an overlap between the variation allowance based on the tooth position at the timing to receive the frame and the variation allowance settled at the timing to receive the previous frame. The new variation allowance can be limited to the overlap. Therefore, the wheel position detector can fast and accurately specify wheel positions.

Alternatively, the second control portion may increase a range of the variation allowance according as a vehicle speed increases. In this case, a variation in tooth positions may increase as the vehicle speed increases. The variation allowance can be settled more appropriately by increasing the variation allowance as the vehicle speed increases.

Alternatively, the first control portion may transmit the frame, which further includes data that determines a range of the variation allowance set by the second control portion. In this case, increasing a sampling cycle for the acceleration sensor to detect the acceleration degrades the timing detection accuracy when the transmitter reaches the specified angle. The variation allowance can be settled more appropriately by varying it accordingly. The transmitter keeps track of sampling cycles, for example. The transmitter can transmit the frame containing data that determines the variation allowance size to provide the above-mentioned effect.

Alternatively, the second control portion may acquire the gear information at a predetermined period. The second control portion calculates the tooth position when the receiver receives the frame, with using a tooth position indicated by the gear information with the predetermined period, which most approximates to the reception time of the frame, or a tooth position indicated by the gear information with the predetermined period, which occurs immediately before or after the reception time of the frame.

According to a second aspect of the present disclosure, a tire inflation pressure detector includes the wheel position detector according to the first aspect of the present disclosure. The transmitter of each wheel further includes a sensing portion for outputting a detection signal corresponding to a tire inflation pressure of the tire. The first control portion of each wheel processes the detection signal from the sensing portion to acquire information about the tire inflation pressure, and the transmitter stores the information about the tire inflation pressure in the frame, and transmits the frame to the receiver. The second control portion in the receiver detects the tire inflation pressure of the tire on each wheel based on the information about the tire inflation pressure.

The tire inflation pressure detector can fast and accurately detects the tire inflation pressure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A wheel position detector used for a vehicle having a plurality of wheels, each of which includes a tire mounted on a vehicle body, the wheel position detector comprising:
   a transmitter that is arranged at each wheel, and includes a first control portion for generating and transmitting a frame including specific identification information; and
   a receiver that is arranged at the vehicle body, receives the frame transmitted from the transmitter of one of the wheels via a reception antenna at a reception time, and includes a second control portion for performing wheel position detection for specifying the one of the wheels and storing a relationship between the one of the wheels and the specific identification information,
   wherein each transmitter further includes an acceleration sensor that outputs a detection signal corresponding to acceleration, which has a gravity acceleration component varying with a rotation of a respective wheel mounting the transmitter,
   wherein the first control portion of the transmitter at each wheel detects an angle of the transmitter based on the gravity acceleration component in the detection signal from the acceleration sensor,
   wherein each wheel has a central axis as a center of the wheel, a predetermined position of a circumference of the wheel is referred as a zero degree position, and the angle of the transmitter is defined by the transmitter, the center and the zero angle position,
   wherein the transmitter at each wheel repeatedly transmits the frame every time the angle of the transmitter reaches a specified value,
   the wheel position detector further comprising:
   a wheel speed sensor for each wheel that detects a tooth of a gear, which rotates in association with the wheel,
   wherein the gear of each wheel has an outer periphery, which provides teeth as conductive portions and a plurality of intermediate portions between the teeth so that the conductive portions and the intermediate portions are alternately arranged along the outer periphery, and a magnetic resistance of a tooth is different from a magnetic resistance of an intermediate portion,
   wherein the second control portion acquires gear information indicating a tooth position of the gear based on a detection signal from the wheel speed sensor,
   wherein the second control portion sets a variation allowance based on the tooth position when the receiver receives the frame, wherein the second control portion excludes a certain wheel from a candidate of the one of wheels mounting the transmitter that transmits the frame when the receiver receives the frame, and the tooth position of the certain wheel is not disposed within the variation allowance after the variation allowance is set, wherein the second control portion registers a remaining wheel as the one of wheels mounting the transmitter that transmits the frame, wherein the second control portion changes the variation allowance every time the receiver receives the frame, wherein the second control portion sets another variation allowance based on another tooth position when the receiver receives a new frame, and wherein the second control portion changes the variation allowance to a new variation allowance, which is provided by an overlap portion between the variation allowance and another variation allowance.

2. The wheel position detector according to claim 1,
wherein the second control portion increases a range of the variation allowance accordingly as a vehicle speed increases.

3. The wheel position detector according to claim 1,
wherein the first control portion transmits the frame, which further includes data that determines a range of the variation allowance set by the second control portion.

4. The wheel position detector according to claim 1,
wherein the second control portion acquires the gear information at a predetermined period,
wherein the second control portion calculates the tooth position when the receiver receives the frame, with using a tooth position indicated by the gear information with the predetermined period, which most approximates to the reception time of the frame, or a tooth position indicated by the gear information with the predetermined period, which occurs immediately before or after the reception time of the frame.

5. A tire inflation pressure detector including the wheel position detector according to claim 1,
wherein the transmitter of each wheel further includes a sensing portion for outputting a detection signal corresponding to a tire inflation pressure of the tire,
wherein the first control portion of each wheel processes the detection signal from the sensing portion to acquire information about the tire inflation pressure, and the transmitter stores the information about the tire inflation pressure in the frame, and transmits the frame to the receiver, and
wherein the second control portion in the receiver detects the tire inflation pressure of the tire on each wheel based on the information about the tire inflation pressure.

* * * * *